(12) United States Patent
Filhaber

(10) Patent No.: US 10,620,447 B2
(45) Date of Patent: Apr. 14, 2020

(54) SYSTEM AND METHOD FOR REDUCED-SPECKLE LASER LINE GENERATION

(71) Applicant: Cognex Corporation, Natick, MA (US)

(72) Inventor: John F. Filhaber, East Haddam, CT (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/675,629

(22) Filed: Aug. 11, 2017

(65) Prior Publication Data

US 2018/0203249 A1  Jul. 19, 2018

Related U.S. Application Data

(60) Provisional application No. 62/448,250, filed on Jan. 19, 2017.

(51) Int. Cl.
*G02B 27/48* (2006.01)
*H04N 13/254* (2018.01)
(Continued)

(52) U.S. Cl.
CPC .............. *G02B 27/48* (2013.01); *G01B 11/14* (2013.01); *G01B 11/2518* (2013.01);
(Continued)

(58) Field of Classification Search
CPC ......... G01N 21/956; G02B 27/48; G01J 1/31; H01S 5/026; G06F 3/02; G06K 9/00
(Continued)

(56) References Cited

U.S. PATENT DOCUMENTS

| 4,011,044 A | 3/1977 | Uzgiris |
| 4,155,630 A | 5/1979 | Ih |

(Continued)

FOREIGN PATENT DOCUMENTS

| DE | 202006007691 U1 | 8/2006 |
| EP | 3064895 A1 | 9/2010 |

(Continued)

OTHER PUBLICATIONS

Riechert, Falko, "Speckle Reduction in Projection Systems", Dissertation, Universität Karlsruhe, 178 pages, 2009.

*Primary Examiner* — Patricia I Young
(74) *Attorney, Agent, or Firm* — Loginov IP

(57) ABSTRACT

A coherent beam moves across a stationary line generator, allowing the speckle pattern projected through the diffuser onto the surface—for example using a MEMS mirror, or another arrangement that is free of a moving mass, such as solid state beam deflector (e.g. an AOM). Where an image sensor is employed, such as a DS, the beam is moved at a speed of at least ½ cycle per image frame so that the full length of the line within the imaged scene is captured by the image sensor. The distance traversed on the diffuser provides sufficient uncorrelated speckle patterns within an exposure time to average to a smooth line. The MEMS mirror can be arranged to oscillate in two substantially orthogonal degrees of freedom so that the line is generated along a first direction and the line moves along the working surface in a second direction.

27 Claims, 15 Drawing Sheets

(51) Int. Cl.
  *G01B 11/14* (2006.01)
  *G01B 11/25* (2006.01)
  *G02B 26/10* (2006.01)
  *G02B 27/30* (2006.01)
  *G02B 5/02* (2006.01)

(52) U.S. Cl.
  CPC ........ *G01B 11/2522* (2013.01); *G02B 5/0252* (2013.01); *G02B 5/0257* (2013.01); *G02B 26/105* (2013.01); *G02B 27/30* (2013.01); *H04N 13/254* (2018.05)

(58) Field of Classification Search
  USPC .......................................................... 248/49
  See application file for complete search history.

(56) References Cited

U.S. PATENT DOCUMENTS

| | | | |
|---|---|---|---|
| 4,970,546 A | 11/1990 | Suzuki et al. | |
| 5,191,374 A | 3/1993 | Hazama et al. | |
| 5,648,649 A | 7/1997 | Bridgelall et al. | |
| 6,081,381 A | 6/2000 | Shalapenok et al. | |
| 6,183,092 B1 | 2/2001 | Troyer | |
| 6,317,169 B1 | 11/2001 | Smith | |
| 6,323,984 B1 | 11/2001 | Trisnadi | |
| 6,330,057 B1 | 12/2001 | Lederer et al. | |
| 6,424,407 B1 | 7/2002 | Kinrot et al. | |
| 6,466,368 B1 | 10/2002 | Piepel | |
| 6,594,090 B2 | 7/2003 | Kruschwitz et al. | |
| 6,642,506 B1 | 11/2003 | Nahum et al. | |
| 6,690,474 B1 | 2/2004 | Shirley | |
| 6,739,511 B2 | 5/2004 | Tsikos et al. | |
| 6,800,859 B1 * | 10/2004 | Shishido | G01J 3/10 250/372 |
| 7,164,810 B2 | 1/2007 | Schnee et al. | |
| 7,202,466 B2 | 4/2007 | Babayoff et al. | |
| 7,413,311 B2 | 8/2008 | Govorkov et al. | |
| 8,059,340 B2 | 11/2011 | Khan et al. | |
| 8,113,660 B1 | 2/2012 | Troyer | |
| 2002/0014577 A1 * | 2/2002 | Ulrich | G01B 11/2513 250/205 |
| 2003/0026457 A1 | 2/2003 | Nahum | |
| 2007/0058135 A1 | 3/2007 | Morikawa et al. | |
| 2007/0138284 A1 | 6/2007 | Giordano et al. | |
| 2008/0267241 A1 | 10/2008 | Brown et al. | |
| 2009/0185251 A1 | 7/2009 | Chen et al. | |
| 2010/0020011 A1 * | 1/2010 | Doumuki | G06F 3/0304 345/158 |
| 2012/0147919 A1 * | 6/2012 | Hisanaga | G01B 11/25 372/50.23 |
| 2013/0242275 A1 * | 9/2013 | Kilcher | G02B 26/0833 353/98 |
| 2015/0176977 A1 | 6/2015 | Abele et al. | |
| 2016/0012291 A1 * | 1/2016 | Cleland | A61B 3/1233 382/117 |

FOREIGN PATENT DOCUMENTS

| | | |
|---|---|---|
| JP | 2004191735 A | 7/2004 |
| JP | 3955513 B2 | 8/2007 |
| WO | 7900841 A1 | 10/1979 |
| WO | 00/17810 A1 | 3/2000 |
| WO | 2006072149 | 7/2006 |
| WO | 2009077198 | 6/2009 |

\* cited by examiner

SYSTEM AND METHOD FOR REDUCED-SPECKLE LASER LINE GENERATION

RELATED APPLICATION

This application claims the benefit of U.S. Provisional Application Ser. No. 62/448,250, entitled SYSTEM AND METHOD FOR REDUCED-SPECKLE LASER LINE GENERATION, filed Jan. 19, 2017, the teachings of which are expressly incorporated herein by reference.

FIELD OF THE INVENTION

This invention relates to laser line generation and projection systems, devices and methods, and more particularly to laser line generation and projection systems, devices and methods that can be used in three-dimensional (3D) machine vision systems.

BACKGROUND OF THE INVENTION

Speckle is a phenomenon that affects all lasers and laser line projectors. It is caused by the roughness of the surface that is illuminated causing tiny diffractive regions that give the surface a grainy random "speckle" appearance. The speckle effect is a result of the interference of many waves of the same frequency, having different phases and amplitudes, which add together coherently to give a resultant wave whose amplitude, and therefore intensity, varies randomly. When a surface is illuminated by a light wave, according to diffraction theory, each point on an illuminated surface acts as a source of secondary spherical waves. The light at any point in the scattered light field is made up of waves, which have been scattered from each point on the illuminated surface. If the surface is rough enough to create path-length differences exceeding one wavelength, giving rise to phase changes greater than 2n, the amplitude, and hence the intensity, of the resultant light varies randomly. If light of low coherence (i.e., made up of many wavelengths) is used, a speckle pattern will not normally be observed, because the speckle patterns produced by individual wavelengths have different dimensions and will normally average one another out. However, speckle patterns are inherent in coherent light sources, such as lasers.

Speckle can be problematic in certain imaging applications—for example a laser displacement sensor (DS), which projects a laser line (based on a fan formed (e.g.) by passing a laser beam through an aspherical lens (such as a Powell lens or another appropriate generator including cylinder lenses, holographic, cylinder arrays, linear diffusers, or combinations thereof) onto a surface, and receives the reflected light at a camera sensor along a camera axis that is not parallel to the axis of the laser fan. The DS processor thereby triangulates on the surface profile. However, the lumpy and asymmetric irregularity of the received line light, as a result of speckle, limits the precision of the location of the line by the camera sensor. The lumpiness in the line is read as an error in height of the surface. The reduction of speckle enables a lower uncertainty and higher accuracy measurement of profile by the DS.

There are several available techniques for reducing speckle. For example, a moving diffuser can be placed within the path of a stationary beam, causing an incoherent superposition of random speckles fills in the image of the line with the average of several uncorrelated speckle patterns. Disadvantageously, the diffuser tends to be a relatively high in mass (compared to the scale of other components), and moving it requires mechanical complexity and can limit the rate of change of the speckle pattern, and hence, the frame rate of the system. Other approaches for reducing speckle (including wavelength broadening) are also disadvantageous to varying extents, involving added cost, complexity and/or other disadvantages. Thus, such approaches are less desirable to employ in a practical laser line-projecting arrangement.

It can also be challenging to accurately scan an object using a laser line. In general, many scanning arrangements rely upon the object, the camera and/or the illuminator to move as motion is tracked and translated into relative distance within the vision system processor. This requires mechanical systems that can be subject to wear and degradation due to (e.g.) conditions in the scanning environment.

SUMMARY OF THE INVENTION

This invention overcomes disadvantages of prior art by providing a coherent light (laser) beam that moves (e.g. laterally), in a (e.g.) cyclic manner, across a stationary line generator (e.g. a linear diffuser, hologram or other diffractive element, and/or cylinder array). This allows the local phase of the line pattern projected through the diffuser onto the surface to change significantly faster, as a relatively small mass is cycled to redirect the beam using a moving mirror structure—for example using a MEMS mirror, or another arrangement that is free of a moving mass, such as solid state beam deflector (e.g. an AOM). This arrangement allows for relatively short exposure times since the projected phase, and thus, imaged speckle pattern varies at a high rate. The use of a linear diffuser allows for a high quality line that is generally free of diffusion and/or broadening (in thickness) in the direction substantially perpendicular to the line's axis (the line's thickness). In an embodiment in which an image sensor is employed, such as a DS, the beam is moved at a speed of at least ½ cycle (left-right) per image frame so that the full length of the line within the imaged scene is captured by the image sensor. The addition of a field lens to maintain the line generated by the diffuser substantially stationary on the surface reduces frame to frame and interline variation of line intensity that would result from a partial scan of less than or more than one-half (½) cycle. Operationally, the distance traversed on the diffuser provides sufficient uncorrelated speckle patterns within an exposure time to significantly average to a smooth line and reduce the speckle contrast. In further embodiments, a mirror assembly (e.g. MEMS) having two degrees of freedom can be employed with the above-described arrangement to generate the line along a first direction and scan the object surface along a second (orthogonal) direction. The first direction is generally scanned at a high frequency while the second direction is scanned at a slower frequency.

In an illustrative embodiment, a system and method for generating a line on a working surface with reduced speckle includes an (e.g. oscillating) laser source in the form of a collimated beam and a line generator that receives at least a portion of the moving collimated beam and projects the light passing therethrough onto the working surface as a line. A moving element moves the collimated beam in a sweeping (e.g.) cyclic motion substantially within at least one plane. Illustratively, the laser source can comprise a stationary laser beam source and a (e.g.) cyclically moving beam deflector that is driven by the moving element. By way of non-limiting example, the beam deflector can comprise a MEMS mirror. The beam deflector can alternatively be driven by another mechanism, such as a galvanometer, or the beam deflector can be a solid state unit, such as an AOM. Illustratively, the line generator can be a linear diffuser. In another embodiment the line generator (e.g. a linear diffuser) is moved by the moving element so that the collimated beam is formed into a line by a combination of the optics of the diffuser and its oscillatory motion. The arrangement can also have a field lens located between the oscillating laser source and the line generator, and the field lens can be unitary with the line generator—for example, defined in a hologram that also provides a linear diffuser function. The MEMS mirror can be arranged to oscillate in each of two degrees of freedom that are substantially orthogonal so that the line is generated along a first (fast) scan direction and the line moves along the working surface in a second (slow) scan direction. In various embodiments, the line generator can be adapted/used to comprise/construct a laser displacement sensor (DS). The DS can be operatively connected to a vision system processor. In embodiments, the line generator can comprise an optical component having at least one of a linear diffuser, a hologram and a cylinder array, and can be arranged to project the line in a non-continuous pattern. This non-continuous pattern can define at least one of dots, and line segments separated by non-illuminated gaps, or other appropriate patterns. In embodiments, light is captured from at least a portion of the line projected on the working surface with a sensor. The sensor then generates image data from the captured light. The image data can be processed/used to perform a measurement and/or inspection on a region of the working surface. The working surface can define at least a portion of an object to be measured.

In another embodiment, a system and method for reducing at least one of speckle effect and sparkle effect in a line projected on a surface is provided. The system and method employ a collimated light source, and an optical component that generates a fan of light within a one or more predetermined angles on each side of a central optical axis. A line generator, through which the beam or fan passes, is located between the optical component and the surface. The optical component can comprise at least one of a MEMS mirror, a solid state deflector and a Powell lens and the collimated light source is a laser.

In another embodiment, a system and method for scanning a surface to determine a 3D profile, which advantageously allows the profiler and the object to remain relatively stationary during scanning, is provided. A vision system camera is arranged to image the surface along an optical axis thereof. A collimated light source is also provided, remote from, and arranged to, project a beam at a non-parallel angle with respect to the optical axis. A MEMS mirror receives the beam from the collimated light source and projects it onto the surface at a non-parallel angle with respect to the optical axis. A mirror controller drives/oscillates the MEMS mirror in at least two orthogonal degrees of freedom so as to (a) generate a fan of light along a first direction within a one or more predetermined angles on each side of a central optical axis and (b) move the fan along a second direction to cause the fan to scan a surface. A line generator, through which the fan passes, is located between the MEMS mirror and the surface. Illustratively, a polarizing beam splitter and polarizer is located along the optical path of the collimated light source. A cylindrical lens can be provided within the optical path. Illustratively, the line generator can comprise a linear diffuser. The mirror controller is arranged to oscillate the MEMS mirror at a first rate in the first direction and a second rate, slower than the first rate, in the second direction. The vision system camera can include an image sensor with a first optical plane and a lens assembly with a second optical plane that is non-parallel to the first optical plane. Each of the first optical plane and the second optical plane are oriented to adhere to the Scheimpflug principle with respect to a plane defined by the fan.

BRIEF DESCRIPTION OF THE DRAWINGS

The invention description below refers to the accompanying drawings, of which.

DETAILED DESCRIPTION

I. Vision System Implementation

Figure 1:
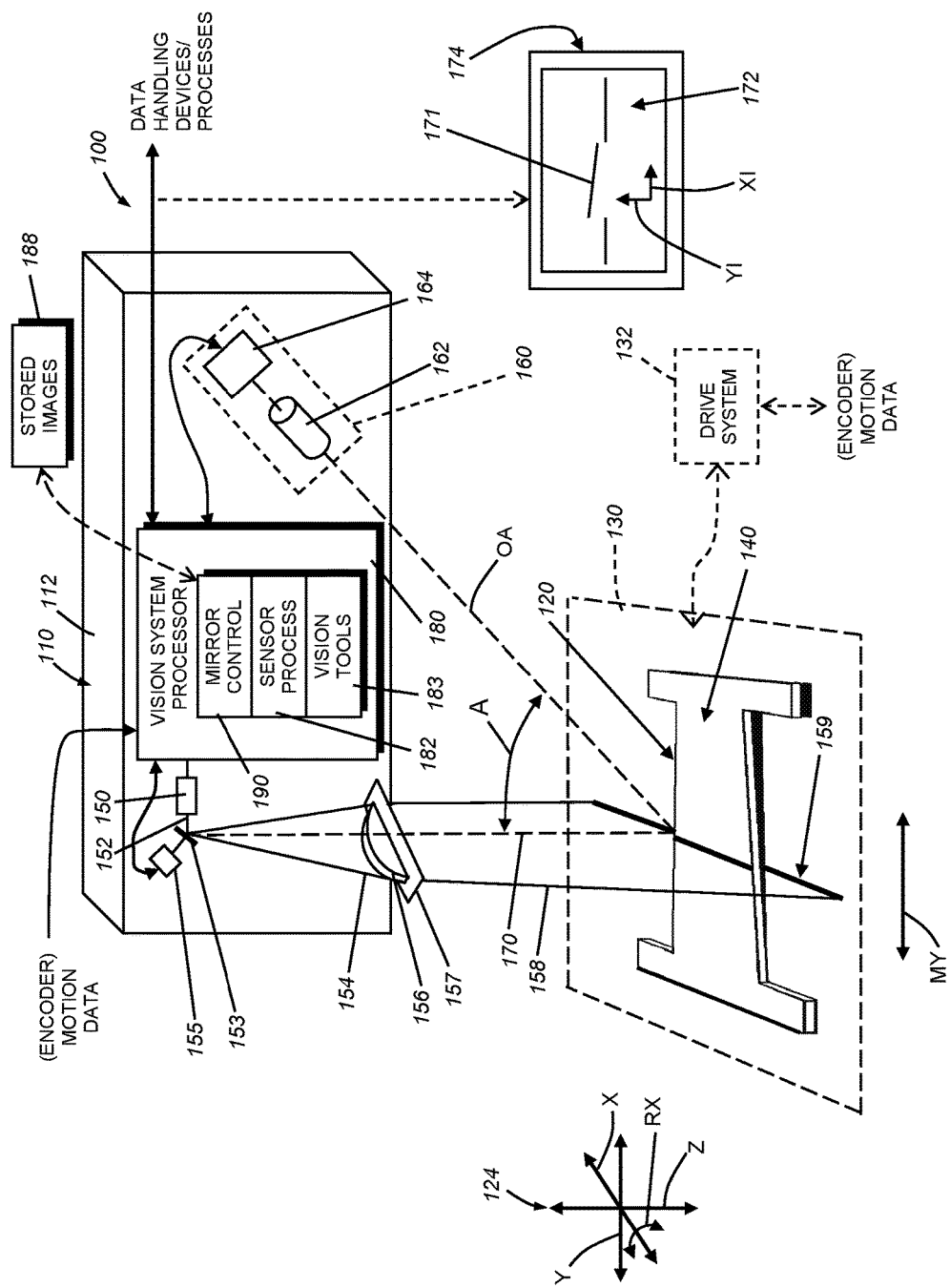
FIG. 1 is a schematic perspective view of a laser displacement sensor (DS) system acquiring an image of an object as relative motion occurs therebetween in a scanning direction, employing a speckle reduction system according to an exemplary embodiment.

By way of non-limiting example, FIG. 1 shows a vision system arrangement 100 including a laser displacement sensor (DS) assembly 110 oriented to image an object 120 (also sometimes referred to as a "part"). The DS assembly 110 can be contained in a single housing 112 that is mounted at an appropriate location with respect to the imaged scene. In alternate embodiments, the displacement sensor can comprise discrete, separated subcomponents. In an exemplary implementation, the object 120 and the displacement sensor 110 are in relative motion (double arrow MY) with either the displacement sensor 110, the object 120, or both, moving (the scan motion direction) along at least one axis of the relative coordinate system 124 (in this example, the physical y-axis direction). In a typical arrangement, the object 120 is located on a motion conveyance 130 (shown in phantom) that provides motion data from an encoder or similar device operatively connected to the motion drive system 132 in a manner clear to those of skill in the art.

Also, as described further below, the system and method can be employed on images that are acquired and then stored for further processing. Such images can be transmitted for processing by the system and method (i.e. a filtering process and associated vision system tools) in a manner in which the processor is free of connection to the camera assembly or other image acquisition arrangement.

The object 120 is, by way of example, a structure having a surface 140 that defines a generally three-dimensional (3D) profile, in which (e.g.) the height (i.e. the displacement dimension along the physical z axis) varies with respect to the x-axis and y-axis directions. This is only one example of a wide range of possible surface shapes, and is described as a useful example of the principles of the illustrative embodiment of the system and method. In further examples the outer, surrounding surface can define a more complex perimeter with different/additional features.

The DS assembly 110 includes a laser beam assembly 150 that projects a coherent beam 152. The beam 152 is directed to a moving beam deflector (e.g. a mirror—described in further detail below) 153 which, in this embodiment turns the central axis (dashed line 170) of the beam generally 90 degrees. Note that the depicted 90-degree (right) angle is exemplary, and the angle of beam deflection can vary widely depending upon the configuration of the system other desired design criteria. The deflector 153 includes a drive or other mechanism (including a solid state arrangement as described below) 155 that causes the deflector to reflect the beam in a lateral, cycling pattern (e.g. left right). In an embodiment the drive 155 can cause the deflector to pivot on an axis between a +/−angle. The reflected beam cycles left-right so as to trace out a projected fan 154 centered around the fan axis 170. This beam of the fan passes into an optical structure that includes a cylinder lens 156 and a linear diffuser 157. The lens (optional in various embodiments) redirects the resulting fan 158 toward the object 120 and surrounding scene in a desired configuration. As described in detail below, the diffuser 157 and moving deflector 153 generate an optical pattern that effectively negates speckle in a manner free of substantial thickening/broadening of the resulting line 159.

As shown, the traced-out line 159 is defined along the physical x-axis (transverse to the scan motion direction MY). The traced fan 158 resides generally in a plane that, in this embodiment, is approximately (or substantially) perpendicular to a reference plane, such as the physical x-y plane of the motion conveyance 130 and/or a plane of the surface 140 of the object 120. The displacement sensor 110 also includes a camera assembly (dashed box 160) consisting generally of a lens/optics assembly 162 potentially arranged in a well-known Scheimpflug configuration (or any other appropriate optical arrangement that should be clear to those of skill) and an image sensor assembly 164. The image sensor assembly 164 contains an array of photosensitive pixels defining a predetermined resolution, and the camera assembly 160 generally defines an optical axis OA that intersects the object 120 in the region of the line 159. The camera optical axis OA defines a non-parallel (e.g. acute) angle A with respect to the plane (and associated axis 170) of the laser fan 158. Thus, any physical z-axis height variation/displacement in the line along the physical x-axis is imaged by the camera assembly 160 as a variation in position (along the image axis YI) in the resulting line 171 of a two-dimensional (2D) image 172 as shown generally in the exemplary (and optional) user interface display 174.

Note that the depicted arrangement of axes (x, y, z) is a convention, and other representations of relative orientation (e.g. polar coordinates) are expressly contemplated. As shown, rotation about a given axis is also represented, for example by the double-curved arrow Rx, which depicts rotation about the physical x-axis.

The image sensor 164 is operatively interconnected to a vision system processor 180 that is contained within the housing 112 of the displacement sensor 110 in this embodiment. In alternate embodiments, some or all of the vision system processor components and/or processes can reside remote from the housing (on an interconnected tablet, laptop or PC that can be associated with the display 172, for example). The vision system processor 180 performs a displacement sensor process 182 in accordance with the illustrative embodiment described in detail further below. The processor 180 may also receive relative motion signals from the motion conveyance 130 or another moving device (e.g. a gantry or manipulator holding the displacement sensor and/or the object). Images are acquired in association with such motion signals so that the line 156 is registered with the physical position in the scene. Images can be stored in an appropriate memory or storage location 188 for subsequent transmission and/or analysis. Note that the use of a DS with relative motion versus the object under inspection is exemplary of a wide range of applications in which the line-generation system of this embodiment can be employed. For example, a DS of the type depicted can be employed in a static configuration in various applications—for example to generate static line profiles or cross sections on objects that are stationary (free of relative motion). The reduced-speckle line generated by the illustrative embodiment is beneficial in increasing the accuracy of such measurements.

The DS assembly 110, or another device, can include/incorporate appropriate vision system tools and processes (ors) 183, such as edge detectors, line finders, blob analyzers, calipers, etc. These tools and processes(ors) 183 analyze 3D images provided by the sensor assembly 164, and generate results based upon such analysis. By way of non-limiting example, image data (i.e. a range image or 3D point cloud) and/or analyzed results is/are transmitted to downstream data handling devices and processes for use in various production activities, such as inspection, quality control, object manipulation, assembly, etc.

The processor arrangement 180, or another module, can include a mirror/deflector control processs(or) 190, which is interconnected to the beam deflector driver 155. This control 190 operates the deflector at an appropriate cycle rate (frequency), and can be based on the acquisition frame rate of the sensor assembly so as to ensure that each frame images a complete trace of the beam on the object surface 140.

II. Generalized Despeckled Beam Arrangement

Figure 3:
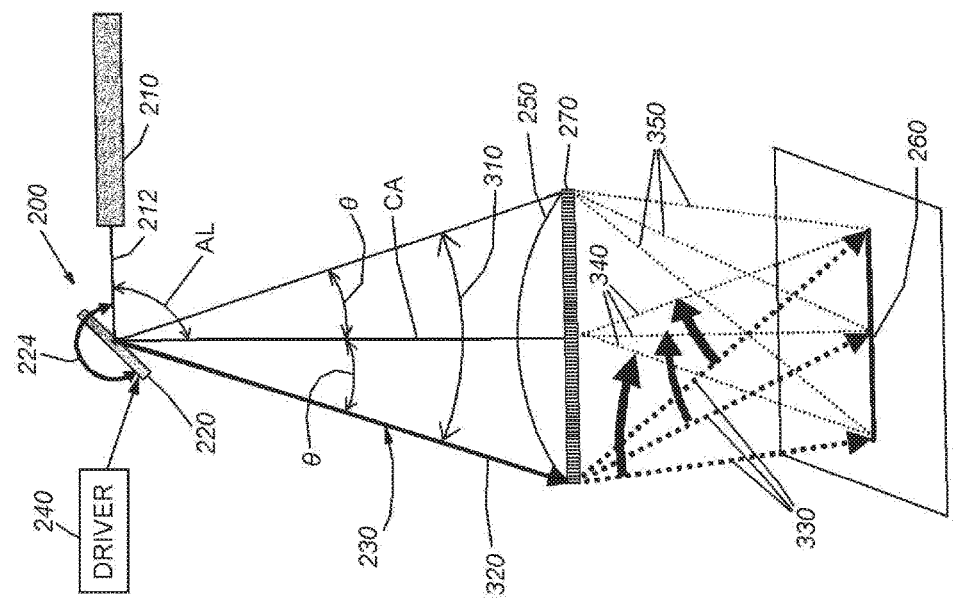
FIG. 3 is a front oriented view of the laser line generator of FIG. 2.
Figure 2:
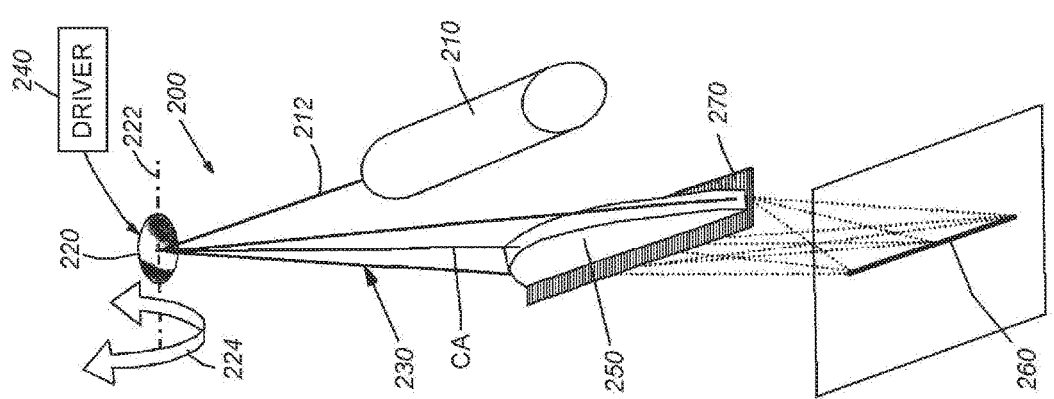
FIG. 2 is a side-oriented perspective view of a laser line generator with a speckle reduction (despeckling) arrangement according to the exemplary embodiment of FIG. 1.

While the above-described DS embodiment provides a particular implementation in which a despeckled line can be used advantageously to produce vision system results, the beam generation arrangement can be employed in any of a variety of applications, including range finders, 3D topology scanning systems, laser levels, other forms of triangulation systems, etc. FIGS. 2 and 3 depict a generalized arrangement for a laser line generation system 200 that is adapted to despeckle the beam for greater line accuracy and consistency.

As depicted, the generator 200 includes a laser 210 of appropriate power output and wavelength. The laser 210 can be a solid state, diode-based device or another appropriate unit with a relatively compact design and form factor. Inherently, the laser projects a collimated beam 212 of light that is temporally and spatially coherent in any appropriate wavelength (including near-visible UV and IR).

The input beam 212 is directed along an input path to a beam deflector (any form of mirror/reflecting surface or solid state sweep generator) 220 that deflects all, or nearly all, of the beam 212 into an output path shown centered about an axis CA. Illustratively, the axis CA of the output path is oriented at an angle AL that is 90 degrees (right angle) with respect to the input beam 212. The angle AL is highly variable in alternate implementations. The beam deflector moves in a reciprocating (e.g. rotational) motion along one axis. The beam deflector 220 can comprise any mechanical or solid state mechanism for diverting the reflected path if the beam from the central axis CA. Illustratively, the beam deflector 220 can be a microelectromechanical system (MEMS) mirror, galvanometer mirror, acousto-optic modulator (AOM), or other device or material including Lithium Niobate (LiNlBO3) or anything that generates a sweep (double arrow 310 in FIG. 3) of the reflected, output beam (shown at one end of the fan 230 as ray 320) into a planar, fan pattern 230.

In this embodiment, the sweep (represented by double-curved arrow 224) of the beam deflector 220 is oriented about the pivot axis 222 that is centered on the input beam 212. A driving circuit and/or mechanism 240 is operably connected to the deflector 220. The driver should be a circuit and/or mechanism that is appropriate to the technology used to implement to deflector—which should be clear to those of skill. As described below, the driver and deflector are collectively capable of cycling the beam sweep and resulting beam trace (into fan 230) at a rate (left-right) that is high enough to provide a sufficiently random speckle pattern within one exposure time (e.g. one acquired image frame), so that the speckles in the pattern average-out visibly to a smooth line.

The system 200 also includes and optional cylinder lens 250 or similar optical structure. It operates as a field lens to increase efficiency by concentrating all of the light from the sweeping beam 310. The lens renders the entire length of the resulting, projected line 260 more uniform at the projection surface 270 in terms of illumination intensity and speckle averaging. As the lens 250 is optional, it can be omitted in alternate embodiments. In alternate embodiments, the lens function can be built into a hologram or engineered into the line generator (described further below).

The system includes a line generator 270, which can comprise a linear diffuser of conventional or custom design. The line generator 270 is illustratively implemented as an engineered diffuser with a flat top intensity profile. It is adapted to diffuse predominantly in one direction (typically aligned with the direction of the line 260), or as contemplated in this embodiment, in only one direction. By way of non-limiting example, a diffuser is available from RPC Photonics, Inc. of Rochester, N.Y. as an Engineered Diffuser™ Line (EDL) of appropriate parameters. For example, model EDL-10-A defines a line spread of +/−5 degrees with relative constant (flat top) intensity within this angle range, and rapid fall off to zero intensity on either side of the flat top. The scatter by the linear diffuser is relatively uniform along the included angle. Other models allow a greater line spread angle (for example up to +/−60 degrees—120 total degrees). Notably, the diffuser scatter is exclusively along one degree of freedom and virtually no scatter occurs transverse to that one degree. This ensures no thickening/broadening of the projected line.

In alternate embodiments, the line generator 270 can comprise a holographic diffuser or another type of diffuser that causes the beam passing therethrough to divide line into multiple beams along the predominant direction (line 260). This is represented by the beam 320 in FIG. 3, which is broken by the line generator 270 into multiple beams 330 distributed along at least a portion of the working section (length of the line 260). As the beam 310 sweeps through its path, the pattern continues, as represented by beams 340 and 350. This effect serves to average the speckle within the diffuser-generated line, and produces a consistent and accurate overall line. In other words, all points of the line add incoherently over an exposure interval (e.g. an image frame) to form a visual of the complete line.

The sweep angle θ of the beam fan 230 on either side of the axis CA is highly variable and can be based (in part) upon the size of the line generator, and sweep angle 224 of the beam deflector 220. By way of non-limiting example, the angle θ can range between 20 and 30 degrees (e.g. in a MEMS implementation), and the line can define a working section (length) of approximately 1 meter. By way of further example, the mirror surface of the beam deflector (e.g. in a MEMS implementation) 220 can define a diameter of approximately 1.5 millimeters. Illustratively, the MEMS can be set to operate at its natural frequency. By way of example the natural frequency of such a MEMS mirror can be in the range of approximately 20 KHz. It should be noted that MEMS implementations can be manufactured according to a user's specifications by an appropriate fabricator in a manner clear to those of skill.

While a driven or solid state beam deflector is shown and described, it is contemplated that the beam source can be cyclically driven or deflected via (e.g.) an inline component (e.g. a prismatic and/or refractive structure). For example, a voice coil can be incorporated into the laser diode, causing it to oscillate along the degree of freedom. Thus, it is contemplated generally that a beam source can provide a cyclically oscillating beam along one degree or dimension to generate a fan. This oscillating beam is passed through the line generator, wherein it is spread out to the included angle of the line generator via its inherent scatter along the degree of freedom.

Figure 4:
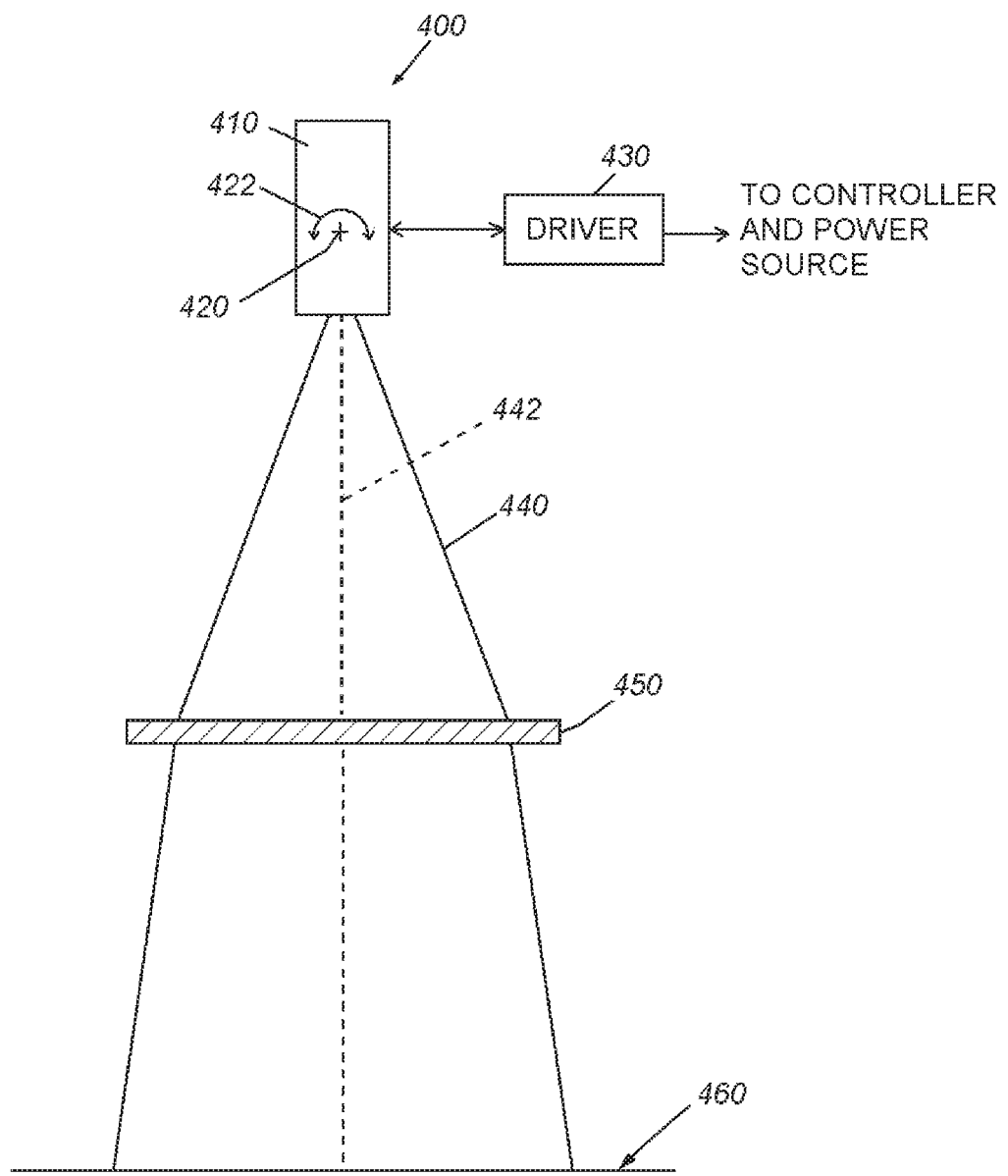
FIG. 4 is a diagram showing a moving laser (beam source) that transmits a cyclically oscillating beam into a laser line generator.

FIG. 4 depicts an arrangement 400 in which the laser 410 is driven about an axis 420 in a cyclically oscillating manner (double curved arrow 422) by an appropriate driver circuit or control 430. The laser 410 can be mounted on a flexure, voice coil or similar component that allows it to move along a degree of freedom so as to trace a planar (fan) pattern 440 relative to a central axis 442. In another embodiment, an inline optical component of the laser, such as a prism and/or lens can be mounted so as to move in a cyclic manner. The oscillating beam is transmitted to a line generator 450 as described herein. The beam is thereby scattered along one degree of freedom, and projected onto the working surface 460 as a speckle-reduced line. A field lens or other focusing structure can be included in line between the laser 410 and the line generator 450, or can be formed into the line generator. In alternate embodiments, the lens can be omitted. The term "oscillating laser source" should be taken broadly to include a moving laser and/or inline optical component of the laser or a laser with a beam deflector as described above—or combinations of such components.

III. Distances and Component Positioning

It should be clear that the above-described components of the line generation system (laser, beam deflector or other mechanism for causing the beam to cyclically oscillate, optional lens and line generator) can be variously combined into one or more housings/enclosures in a precise and stable interrelationship in a manner that provides a desired form factor and functionality for the desired task. Enclosures can be constructed of any appropriate material including polymers, such as polycarbonate, acrylic, etc. or metals, such as aluminum alloy, steel, magnesium alloy, etc. Distance between components and size can be based on working section of line and working distance from beam generator to working surface, in a manner clear to those of skill.

Figure 5:
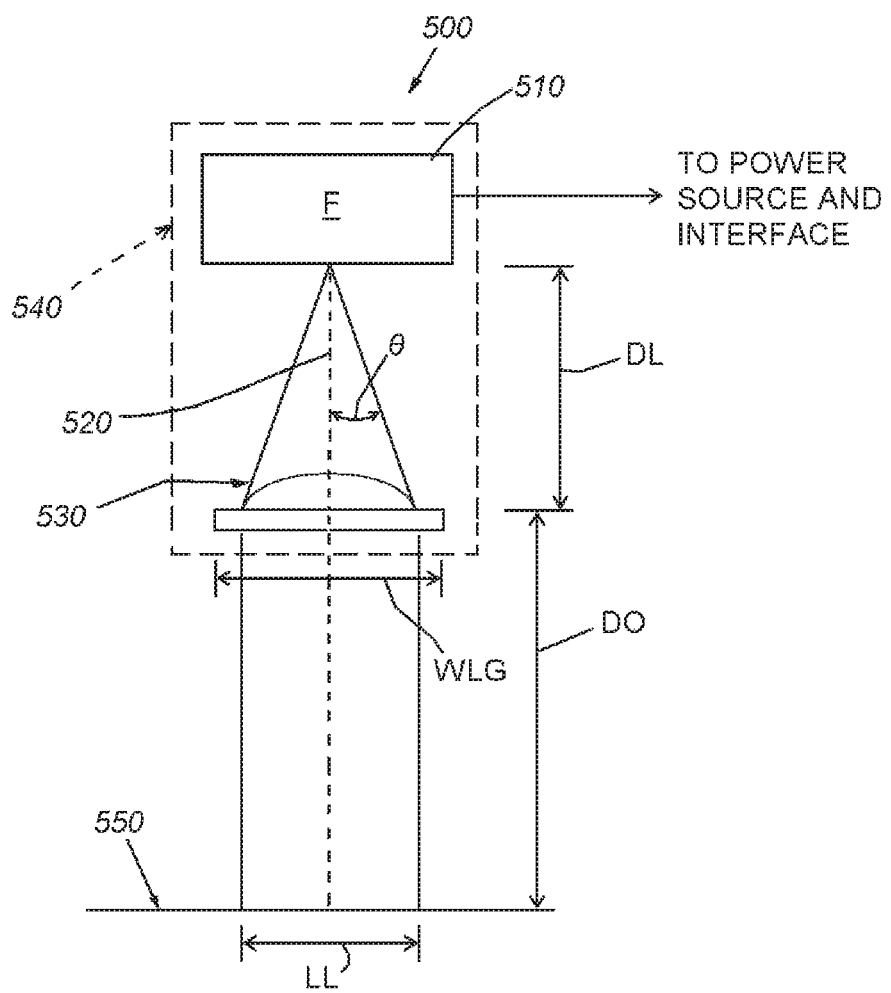
FIG. 5 is a diagram showing the relative relationship between the components of the line generator system and the working surface upon which a line is projected.

FIG. 5 shows a diagram of an arrangement 500 in which the laser and beam deflector (or more generally, an oscillating laser source) are contained in a single unit (e.g. a circuit board) 510, which is interconnected to a power source. The laser provides a sweep of +/−θ degrees with respect to the center axis 520 at a predetermined frequency F, which can be variable based on communication between the system controller and an associated interface. The oscillating laser source 510 is spaced at a distance DL from the (optional) cylinder lens and line generator (linear diffuser) assembly 530. The values for θ and DL dictate the required minimum width WLG of the assembly 530, that is, WLG=2 tan θ*DL. The (optional) lens and line generator assembly 530 can be separate or can be combined with the laser source 510 in a single housing (dashed box 540). Note that the lens and line generator can be separated from each other along the axis 520 in alternate embodiments. In general, the working distance DO between the line generator and the working surface 550 can vary depending upon the application, as well as the desired maximum length LL of the laser line and geometry of the lens and line generator assembly 530. The length LL can also be defined based upon the included angle of scatter inherent in the line generator along the degree of freedom as shown.

IV. Optical Effects

Figure 6:
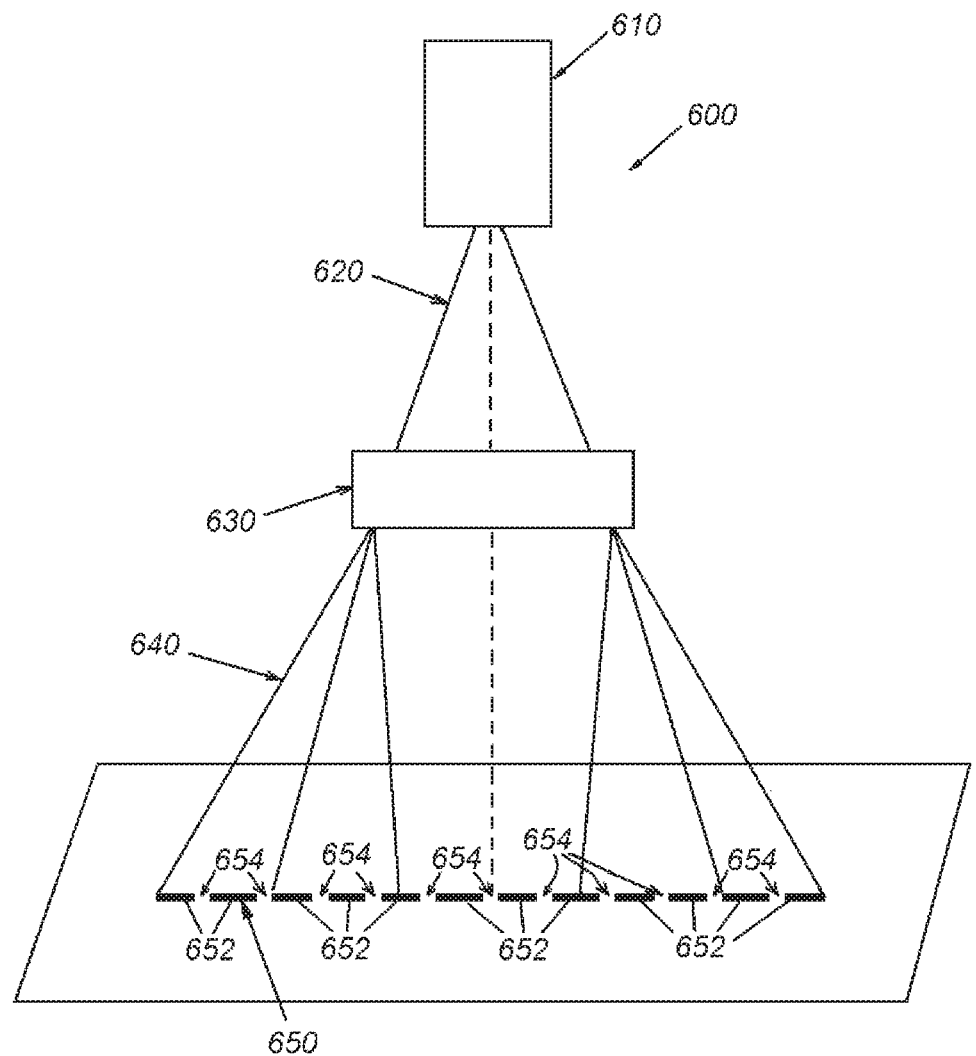
FIG. 6 is a diagram showing the components of a line generator system according to an illustrative embodiment, arranged to generate an exemplary segmented-line feature.

The arrangement of components provided herein enables the generation of lines with a variety of projected features in addition to the advantageous reduction of speckle. FIG. 6 shows an arrangement 600 in which a laser and deflector (or other motion-generating) component 610 generates a sweeping line fan 620 as described above. The fan 620 is transmitted through an optical component 630, which can define any combination of lens, and linear diffuser function. As described generally above the optical component 630 can include (e.g.) a cylinder array or diffractive element and/or a hologram that allows special line effects to be generated. As shown, the diffused rays 640 project a line 650 that is non-continuous, consisting of dashed segments 652, separated by unilluminated gaps 654 along the line axis. This is one of a variety of possible effects that can be generated. For example, the length of segments can vary along the axis (for example through use of a hologram).

Figure 7:
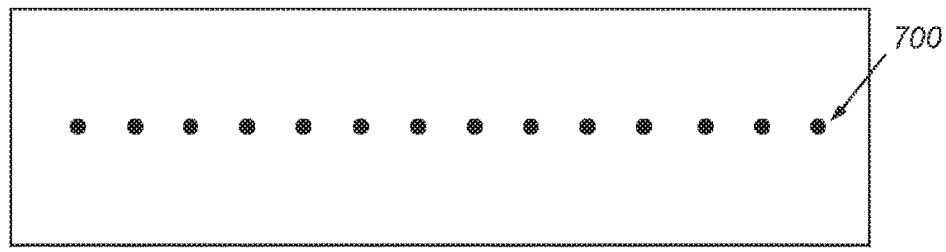
FIG. 7 is a diagram of an exemplary dotted-line feature, generated by a version of the arrangement of FIG. 6.
Figure 8:
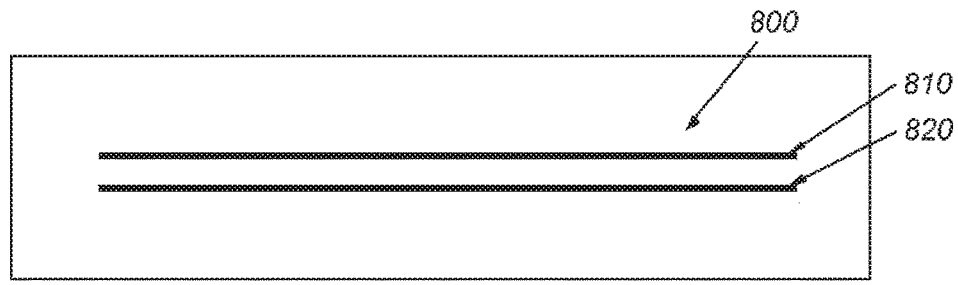
FIG. 8 is a diagram of an exemplary multiple-bar feature, generated by a version of the arrangement of FIG. 6.

In FIG. 7, the arrangement 600 can be used to generate a dotted pattern 700 of appropriate spacing between dots. Likewise, in FIG. 8, the arrangement 600 can be used to generate a line feature 800 that consists of multiple, parallel lines 810 and 820. A variety of optical components (that should be clear to those of skill (e.g. a customized hologram) can be used to divide the projected fan into multiple lines. Such lines can be divided into dots, dashes, etc. as described above.

V. Other Surface Effects

While the principles and embodiments described above relate to the phenomenon of speckle, the foregoing can be applied to reduce undesirable optical effects that relate to certain surface finishes from which the laser line is reflected. Illustratively, surfaces that have small reflective facets— such as machined metal, sand-blasted metal, bead-blasted metal, peened, glittery or metallic painted finishes, etc. can be challenging to measure accurately with a typical laser line source. Since the typical laser line source is conventionally generated from a point source, it tends to generate random bright spots or sparkles that can saturate the image sensor (or other light-receiving component), and reduce the quality of the imaged/detected line. This effect can be termed "sparkle", and it produces optical disadvantages similar to those experienced with the above-described speckle. Thus, for the purposes of this description the term "speckle" should be taken broadly to also include sparkle. Note that sparkle can occur with the reflection of any type of light, whilst speckle is generally unique to reflected coherent light. Implementation of the above-described line generator (e.g. linear diffuser) serves to significantly reduce the sparkle effect. In this respect, the diffuser acts similarly to a conventional diffuser that achieves cloudy day illumination— however, in this instance the diffusive effect produced by the line generator occurs in a single dimension (parallel to the laser line) whereby the line quality on the sparkle-generating surface is not reduced, and the imaged line quality is enhanced.

Illustratively, reduction of the sparkle effect in a laser line or similar line-generated light source can be achieved using a various of the arrangement(s) described above—for example a line generator, comprising a linear diffuser, hologram and/or diffractive array, in combination with a light source (coherent light or another collimated source), which is transmitted to a moving deflector (e.g. a MEMS or solid state device). Alternatively, the beam can be transmitted to a fan-generating optical component (e.g. a Powell lens) according to a prior art implementation and thereafter through the line generator.

VI. Scanning Implementation

Figure 9:
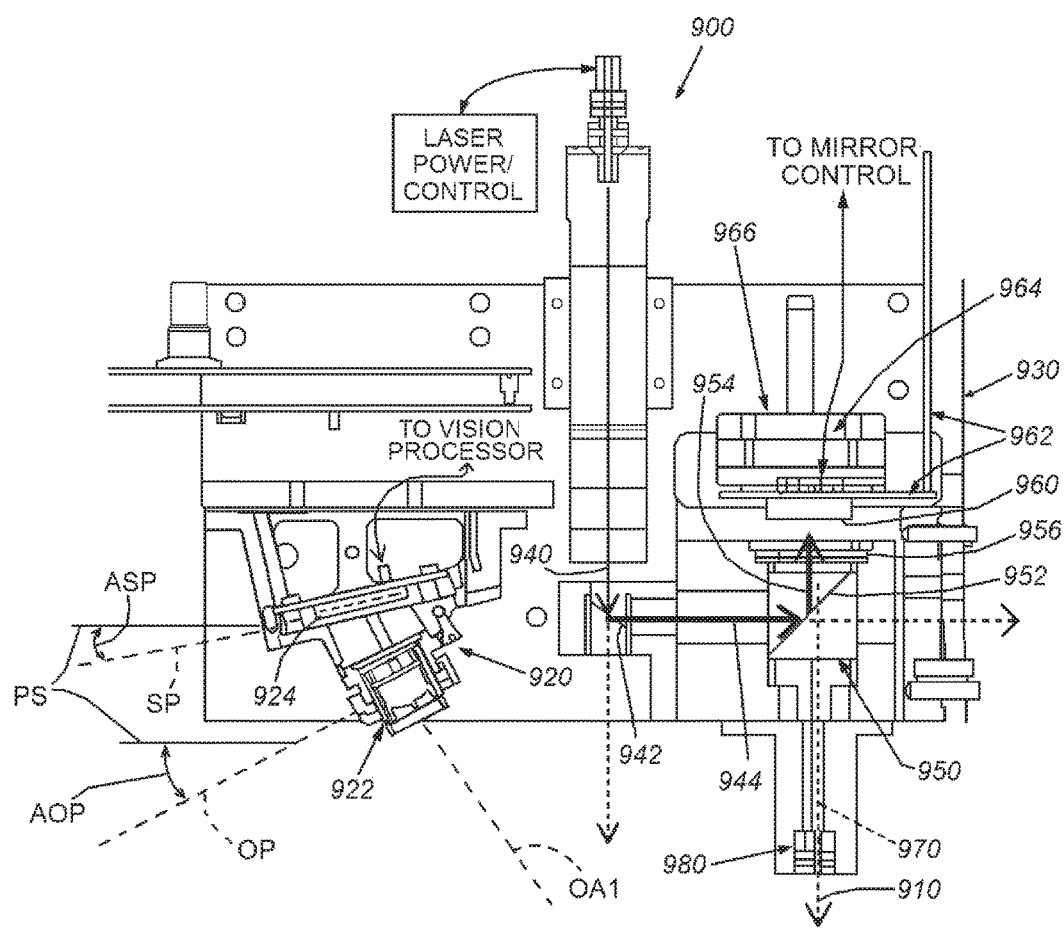
FIG. 9 is a side cross section of an exemplary DS system according to an alternate embodiment in which the lase line generator includes both a speckle-reduction arrangement and a scanning arrangement, employing a MEMs mirror that pivots along each of two substantially orthogonal axes.

FIG. 9 shows a DS system 900 according to an embodiment in which the generated laser line 910 is projected upon a scene/object in a manner that also scans in a direction generally orthogonal to the line's direction of extension—thus vitiating a need for a separate motion-generating mechanism (operating on the DS and/or object) to effect scanning over a predetermined working distance. The processor arrangement is similar to that described with reference to FIG. 1 (i.e. vision system processor 180). However, the mirror control 190 and (e.g. sensor process 182 and/or vision tools) are adapted, as described below, to allow for integrated scanning. In an embodiment, a commercially available, diode-based laser (e.g. approximately 40 mW) can be employed. The projected line can be red or another desired wavelength.

The exemplary arrangement 900 includes a camera assembly 920 including an optics package (i.e. lens assembly) 922 defined along an optical axis OA1, and an image sensor 924. By way of non-limiting example, the optics package 922 can be modelled on the DS 1050 displacement sensor available from Cognex Corporation of Natick, Mass. The image sensor 924 in this exemplary embodiment is a 2D sensor that acquires images of a working section defined by two orthogonal axes (described below). Notably, the lens plane of the lens assembly 922 (dashed line OP) is oriented at an acute angle AOP with respect to the generalized plane (represented by lines PS) of the imaged scene in a range between approximately 20 and 30 degrees. The image plane (dashed line SP) of the sensor 924 is oriented at an acute angle ASP (with respect to the plane of the scene PS) that is generally shallower than the optics angle AOP, for example in a range of 10 to 15 degrees. The angles AOP and ASP are selected to cause lines imaged by the camera assembly 920 within the working section to adhere generally to the Scheimpflug principle, in which the lines appear to the image sensor 924 as relatively constant in thickness between near range and far range of the working section (see below).

The DS system is enclosed in an appropriate housing 930 that maintains the components in an appropriate spatial relationship and can allow the system to be mounted with respect to the scene using brackets, etc. The housing 930 includes a solid state laser assembly (or other mechanism for projecting a similar coherent light). The laser in this embodiment delivers a pencil-like beam 940 of appropriate thickness in the depicted downward direction into a polarizing beam splitter 942, which reflects the resulting beam 944 at a 90-degree angle in a polarized condition as shown. In alternate arrangements, with a laser having a different size or housing form factor, the laser can be directed straight into a polarizer, the beam splitter assembly 950, or other structured-light/conditioning component. The polarized beam 944 is directed into a beam splitter assembly 950 with beam-splitting mirror 952 that again reflects the resulting beam 954 upwardly through a (e.g. ¼λ) wave plate 956. The upwardly reflected beam 954 is projected onto a MEMS mirror 960 that is driven by a (PCB) circuit board 962 mounted on an adjustment plate assembly 964. The PCB is controlled as part of the processor mirror control described above. The adjustment plate assembly allows the manufacturer to apply fine tilt adjustments to the mirror to ensure it is properly aligned using (e.g.) set screws. The overall mirror mounting arrangement 966 is fixed within the housing 930 so that it is generally free of vibration and play allowing the relative angle between the optical axis OA1 and the laser line to remain stable.

Notably, the MEMS mirror in this embodiment can comprise a multi-axis (two-degree of freedom) design that, by way of non-limiting example, is available from Opus Microsystems of Taiwan. Certain models (e.g. the OP-6111) have a fixed scan frequency of 22,000 Hz in a fast direction (+/−20 degrees) and 1,400 Hz in a slow direction (+/−15 degrees). Other soon-to-be available mirrors (e.g. the OP-6200) support fast scan frequencies of 18,500 Hz (+/−22 degrees) and a controllable slow scan frequency (+/−12 degrees) using a voltage waveform signal. The stated operative angle ranges for each pivot axis are exemplary, and in practice, the DS working section will reside in a subset of the overall angle range.

The resulting beam (dashed line 970) is reflected by the MEMS mirror 960 through the wave plate 956, and through the polarizing beam splitter mirror 952. The beam then passes into a (e.g.) cylinder lens/linear diffuser assembly 980. As described above and further below, the linear diffuser employs the principles described herein to spread the beam 970 into the desired fan pattern. Notably, the combination of the polarizing beam splitter 942 and λ/4 wave plate 956 effectively eliminates all back reflections within the optical path. The optical path also includes (at an appropriate position) a thin mask that attenuates light that misses the MEMS mirror and is reflected from the reflective surfaces around the MEMS mirror and the λ/4 wave plate 956 front surface and the polarizing beam splitter 952 back surface. These features significantly reduce alignment requirements for the system during manufacture.

Figure 10:
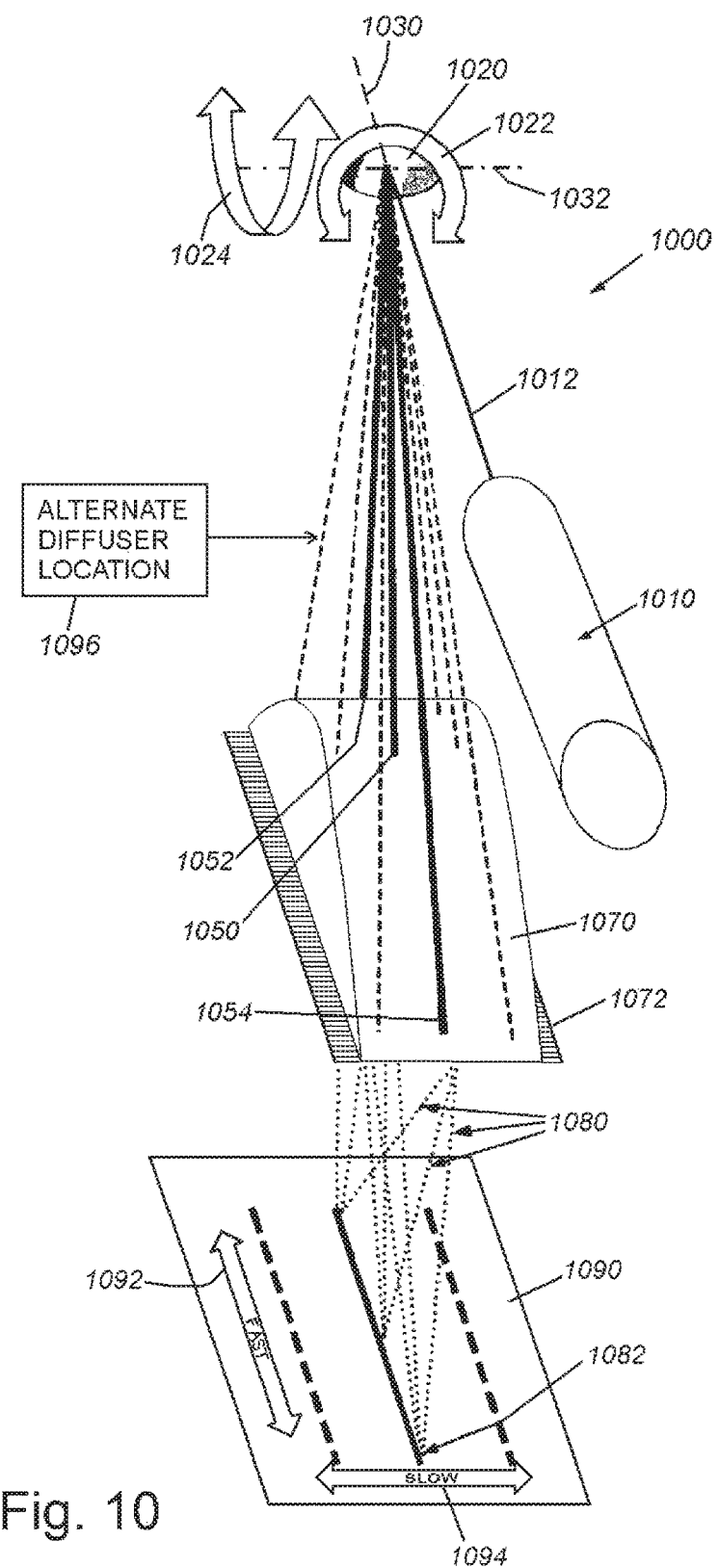
FIG. 10 is a side-oriented perspective view of a laser line generator with a despeckling and single line scanning arrangement according to the exemplary embodiment of FIG. 9.
Figure 11:
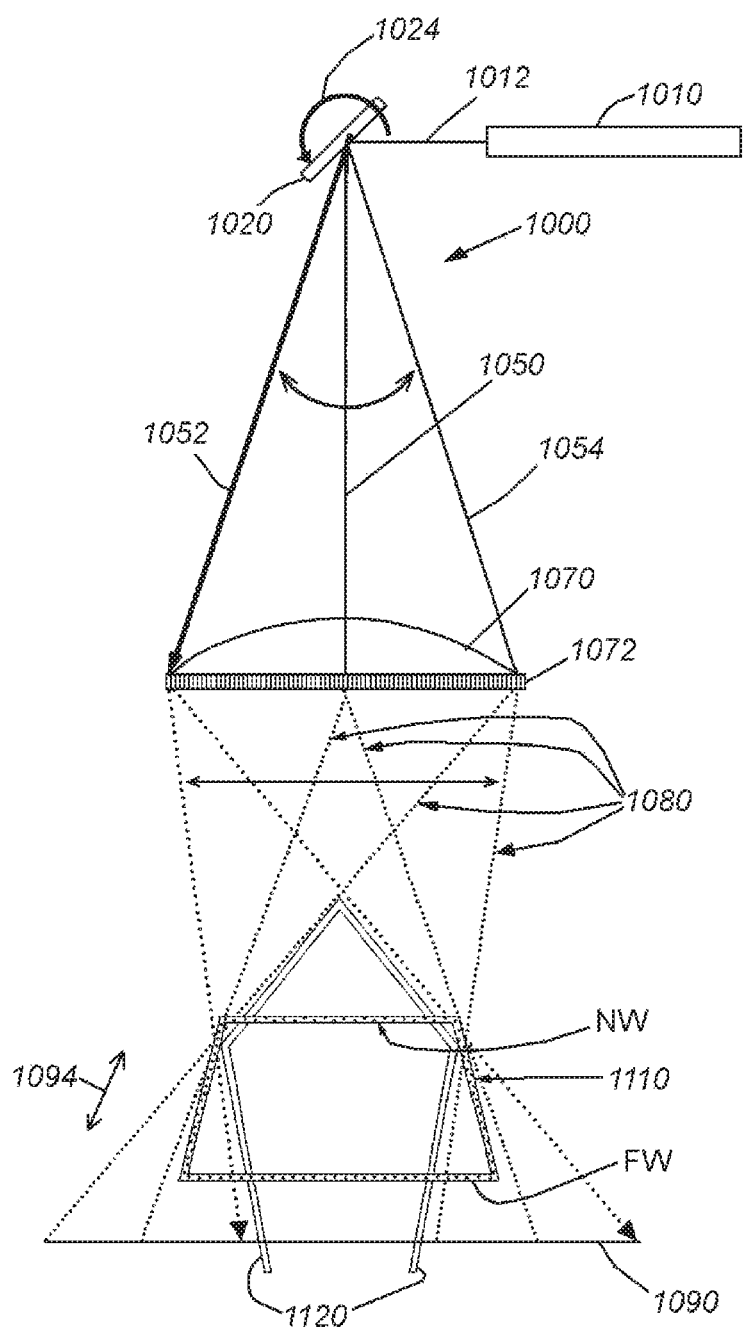
FIG. 11 is a front-oriented, view of the laser line generator of FIG. 10, showing an exemplary working section.

Reference is also made to FIG. 10, which shows an exemplary arrangement detailing the operational theory of the scanning laser arrangement according to the DS 900 of FIG. 9. As shown, the laser source 1010 projects a beam 1012 along an axis to a pivoting (MEMS) mirror assembly 1020. The mirror assembly 1020 oscillates (double-curved arrows 1022 and 1024) about two orthogonal axes 1030 and 1032 (typically oriented at right angles with respect to each other). Typically rotation of the mirror assembly 1020 about the axis 1032 generates a fan pattern that defines a scan line. The fan is denoted by the three lines 1050, 1052 and 1054, and the characteristic of this fan is described above. The laser, in the form of a sweeping fan is directed through an (optional) cylindrical lens 1070 and linear diffuser 1072. The combination of lens 1070 and diffuser 1072 generate the desired spread (lines 1080) in the beam so that the sweeping beam 1050-1054 effectively projects a sweeping fan pattern onto the surface 1090, which thereby defines a despeckled line 1082. The line 1082 is generated by the oscillation of the mirror 1020 in a fast scan direction (double arrow 1092). As described above, the fast scan can oscillate in excess of 20,000 Hz in certain embodiments. Notably, the mirror assembly 1020 also oscillates in a slow scan direction (double arrow 1094), typically at 1,000-2,500 Hz, or less, about the axis 1030 so that the overall fan and line 1082 sweeps along the slow scan direction (1094). With further reference to FIG. 11, the arrangement 1000 is further depicted in FIG. 11. This depiction shows the working section 1110, in which a substantially uniform line (delineated by boundaries 1120) is projected on the surface 1090. The near working section NW and far working section FW are also depicted, and the projected illumination (laser) line appears substantially uniform throughout the (slow) scan range (double arrow 1094), due to the angles chosen for components of the optics package 920.

While the linear diffuser 1072 is shown beneath the cylindrical lens 1070 within the optical path, it is contemplated that the linear diffuser can be located at other positions within the path. For example, it can be located between the mirror assembly 1020 and lens 1070 (location 1096 in FIG. 10) or at other appropriate positions that should be clear to those of skill. Likewise, while a polarizer and/or beam splitter(s) is/are employed, these components can be omitted or altered to suit the performance requirements and/or internal layout of the DS in a manner clear to those of skill.

Figure 12:
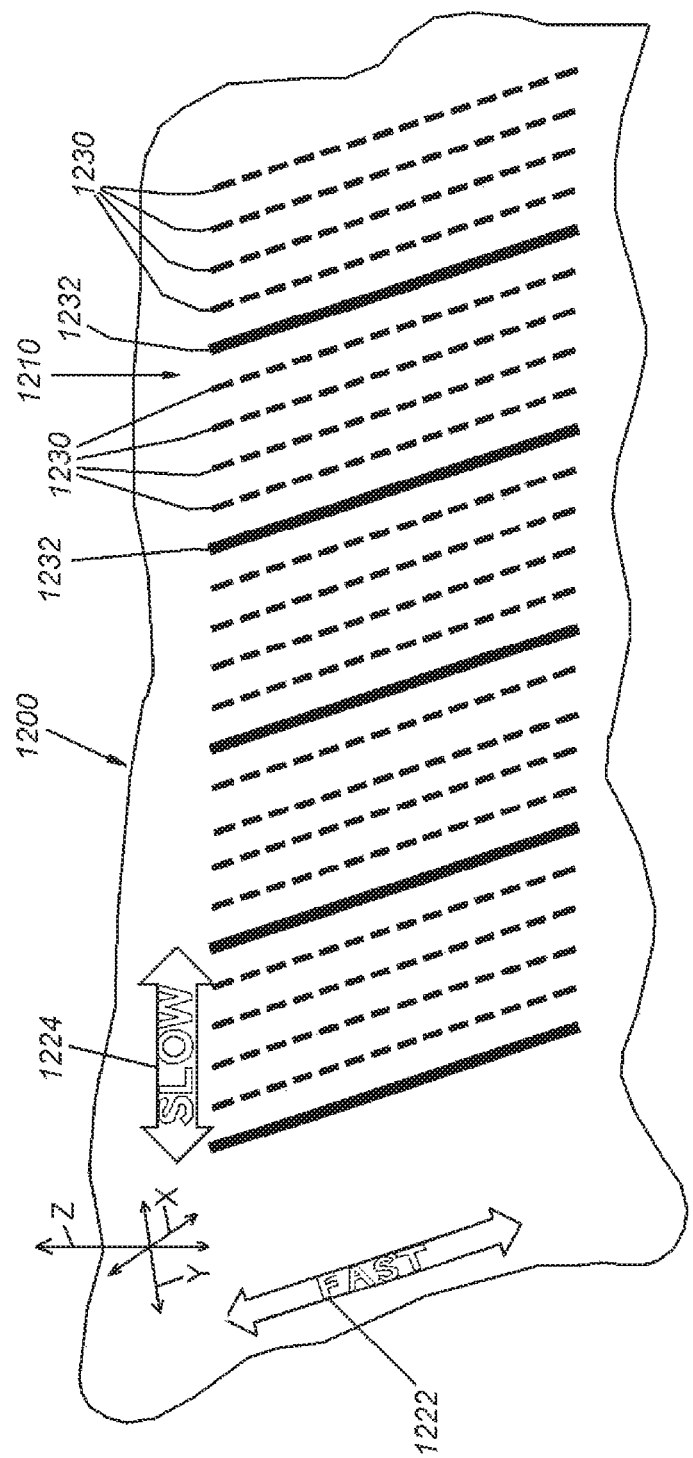
FIG. 12 is a diagram showing multiple simultaneously projected lines (solid) on the surface, and their subsequent positions as they are scanned.

FIG. 12 shows an exemplary scan pattern 1200 projected on a surface 1210 (shown as planar/flat for illustration purposes). The MEMs mirror assembly generates line in the fast scan direction (double arrow 1222) that is swept along the surface 1210 in the slow scan direction (double arrow 1224) so as to cover the working section. A series of scan lines 1232 are depicted, showing a line in each acquired image frame from which a profile is determined. In embodiments in which the mirror sweeps at a relatively fast rate in the slow direction, it is contemplated that the laser can be pulsed or shuttered in certain embodiments to avoid blurring of the line as it is acquired by the image sensor. However, more generally it is contemplated that the slow scan rate can be controlled to allow a sweep that is accurately acquired by the image sensor at its operation frame rate. The acquisition rate should be sufficiently high to capture the line with minimal blur as it sweeps across the surface. The location (along the y-axis direction) of the line can be derived from the motion of the mirror, based upon the mirror control, and used to determine relative location (along the y-axis direction) of the line within the working section. Alternatively, the relative location (along the y-axis direction) of the line versus the near and far boundaries of the working section can be used to determine relative position of the line. Internal calibration of the DS is employed to accurately compute the profile of any acquired line in the height (z-axis) direction.

In further embodiments, the line can be spread into multiple lines along the y-axis direction using an optional, second linear diffractive element. This allows multiple lines to sweep the image, thereby generating multiple profiles. Dashed scan lines 1230 are depicted between solid lines 1232, representing a grouping of lines within a single acquired image frame. This allows multiple profiles to be acquired in each image frame, speeding the overall scan process.

Figure 13:
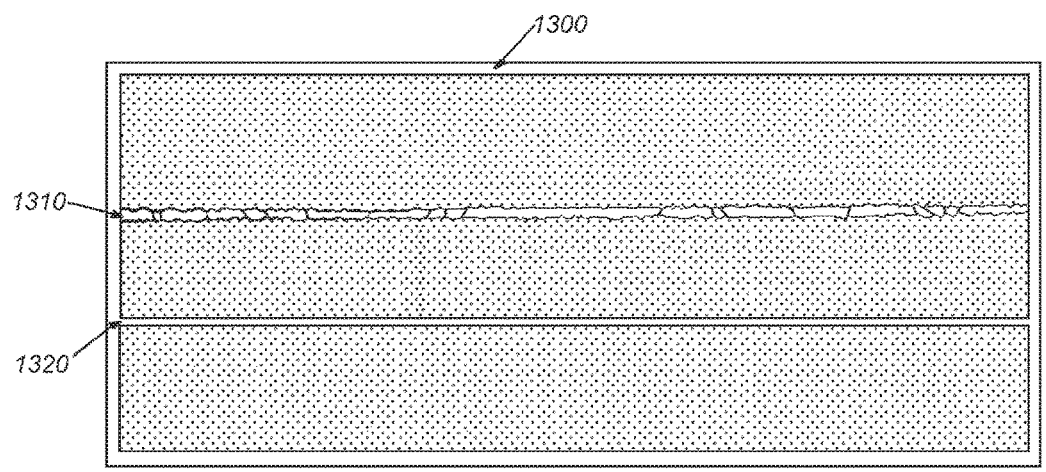
FIG. 13 is a diagram with an image of an exemplary laser line generated by the exemplary DS system of FIG. 9 compared to a side-by-side speckled line generated using conventional optics/components.

With reference to FIG. 13, the depicted image 1300 shows two acquired lines 1310 and 1320. The upper line 1310 is a typical specked line generated using (e.g.) a Powell lens. Note the generally non-uniform edge and granular texture that reduces profile accuracy. The lower line 1320 is generated using the above-described DS arrangement. It is substantially more uniform and defined, allowing for better profile accuracy, a brighter illumination, and hence, a quicker scan of objects. By way of example, the upper line 1310 exhibits 0.240 pixels per 1σ, while the lower line 1320 exhibits 0.074 pixels per 1σ.

Figure 14:
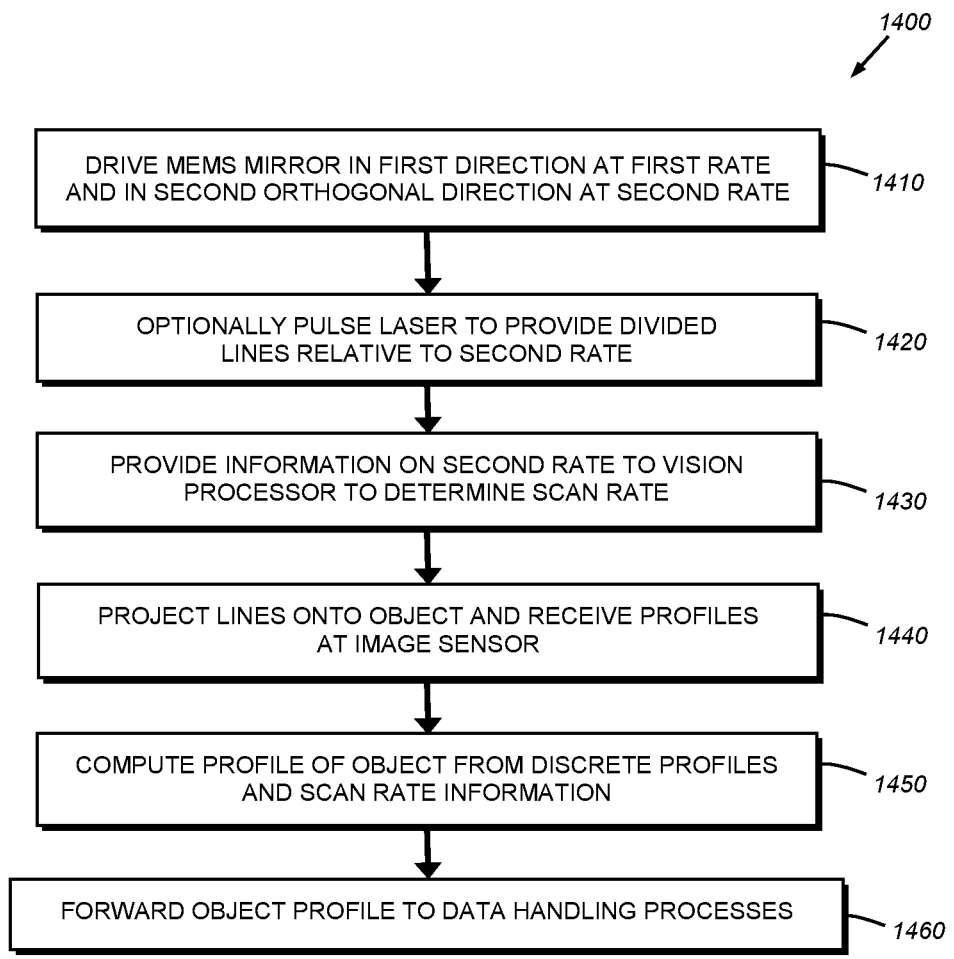
FIG. 14 is a flow diagram showing a generalized procedure for operating a DS system according to FIG. 9.

Reference is now made to FIG. 14, which shows a generalized flow diagram 1400 describing the operation of the DS (900), according to the exemplary embodiment. In step 1410, the mirror control uses appropriate inputs—e.g. constant and/or modulated voltage—to drive the MEMS mirror at a first (fast) rate in a first direction and at a second (slow) rate in a second direction that is substantially orthogonal to the first direction. In step 1420, the projected beam can be (optionally) pulsed or shuttered to allow for reduced blur where the slow scan rate is higher than the sensor acquisition rate can handle. In step 1430, the mirror control can provide information on the slow rate to the vision process(or) so that the location of the line along the y-axis can be determined. This information can also be derived via the acquired image by determining the relative location of the acquired line in the image frame versus the bounds of the working section, and/or through the timing of each acquisition, with knowledge of how far the mirror (and line) moves in each image frame. In step 1440, the line projected on the object in the scene generates profiles that are imaged by the image sensor. In step 1450, the profile is used to compute an object height at that slice based upon the internal calibration data as well as slow scan rate, or other data that provides a y-axis location for the profile slice. In step 1460, the overall profile of the object is stored and/or transmitted to a downstream process that employs the information for further analysis and/or tasks—for example part inspection.

It should be clear that the exemplary DS (900) can be sized appropriately to the desired vision system task. It should be clear to those of skill that associated components can be scaled upwardly or downwardly to provide the requisite functionality to perform the task.

VII. Further Arrangements and Applications

Figure 15:
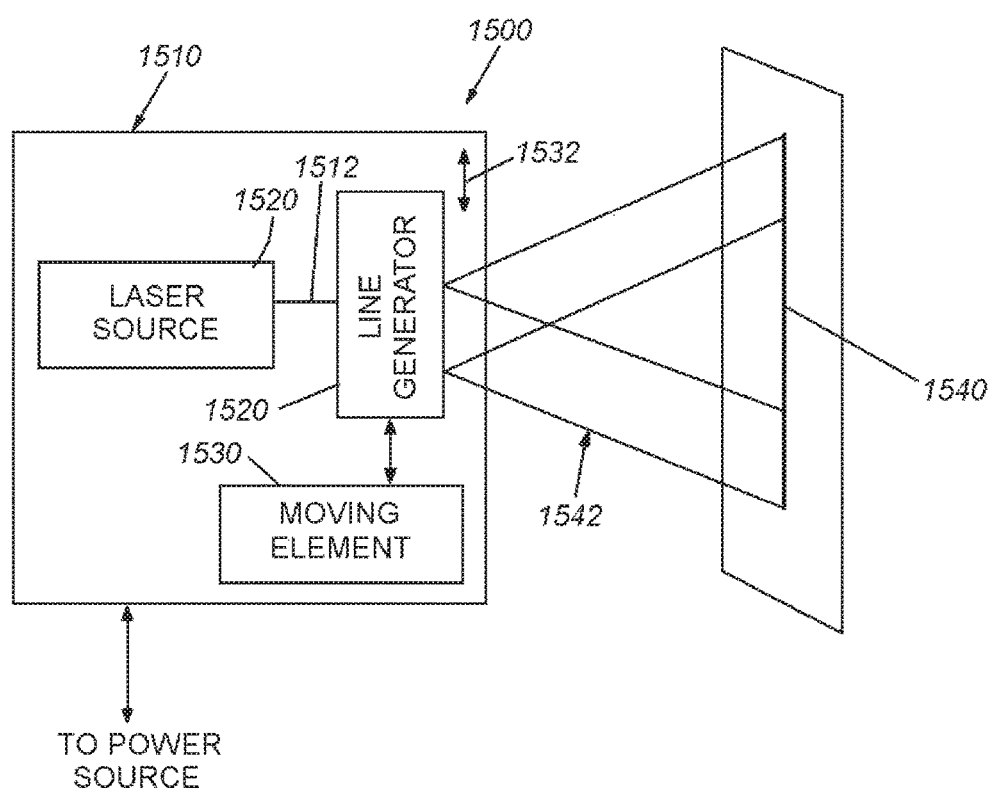
FIG. 15 is a diagram of a generalized line generation system in which a moving element drives a line generator, such as a linear diffuser in an oscillatory manner according to an embodiment.

A variety of other uses and/or implementations of a reduced-speckle laser line can be provided in accordance with the teachings herein. In FIG. 15, the arrangement 1500 shows a version of the reduced-speckle laser line generation system 1510 according to a generalized embodiment in which a laser source 1520, as described above, projects a collimated beam 1512 into a line generator 1520, which can illustrative comprise a linear diffuser of a form described above. Various optics, filters, polarizers, beam splitters, etc. as also described, above can be provided. The line generator 1520 is operatively connected to a moving element (oscillatory driver) 1530 that causes an oscillatory (e.g. cyclic) movement (double arrow 1532) within at least one plane. The moving element can be a MEMS based component, voice coil, or any other acceptable drive system, for example operating on electromagnetic principles. The motion (1532) of the line generator 1520 produces a line 1540 based upon the fan 1542, which it creates through a combination of diffusion and displacement of the beam 1512. The system 1510 is powered by an appropriate power source and controllers as described above.

Figure 16:
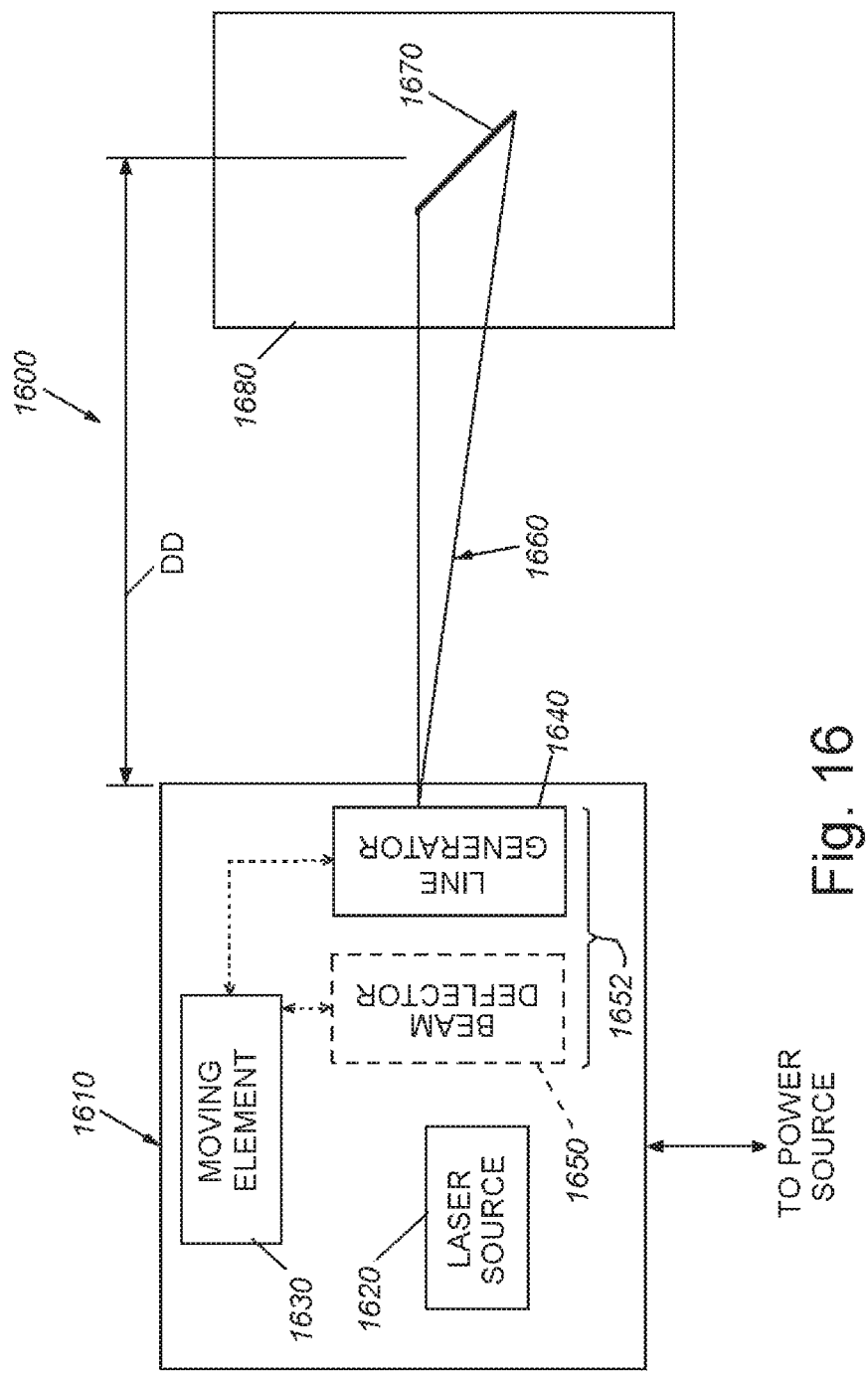
FIG. 16 is a diagram of a line generation system according to any of the above-described arrangements or embodiments shown providing a projected line at a distance for a variety of applications.

In FIG. 16, an arrangement 1600 includes a line generation system 1610 having a laser source 1620, moving element 1630, line generator 1640 and beam deflector (shown in dashed form as optional) 1650. The moving element 1630 can drive the line generator 1640 as described in the arrangement 1500 (FIG. 15) above, or a stationary line generator element (linear diffuser, etc.) can be provided and the beam deflector (e.g. a mirror moved by the moving element) 1650 can generate a fan 1660 from the collimated beam. The term "line generator" in this example can define either the diffusive (or other) optical element in direct combination with the moving element (i.e. FIG. 15 embodiment), or the diffusive element in a stationary mounting with the moving element in combination with the beam deflector (e.g. a MEMS mirror embodiment). Hence, the beam deflector 1650 is depicted as combined (bracket 1652) into the line generator 1640 as these two components can collectively be termed "line generator" in certain embodiments. Notably, the line generating system (1610), according to the various arrangements herein, can be used in applications other than machine vision, where the projection of a despeckled and/or more uniform line is desired. As shown, the line 1670 is projected onto a distant surface 1680, over a working distance DD that can be centimeters, meters, or tens of meters (among other distances), in various embodiments.

For example, the line generating system can generate a more uniform and crisper line in building applications, surveying, targeting, etc.

Figure 17:
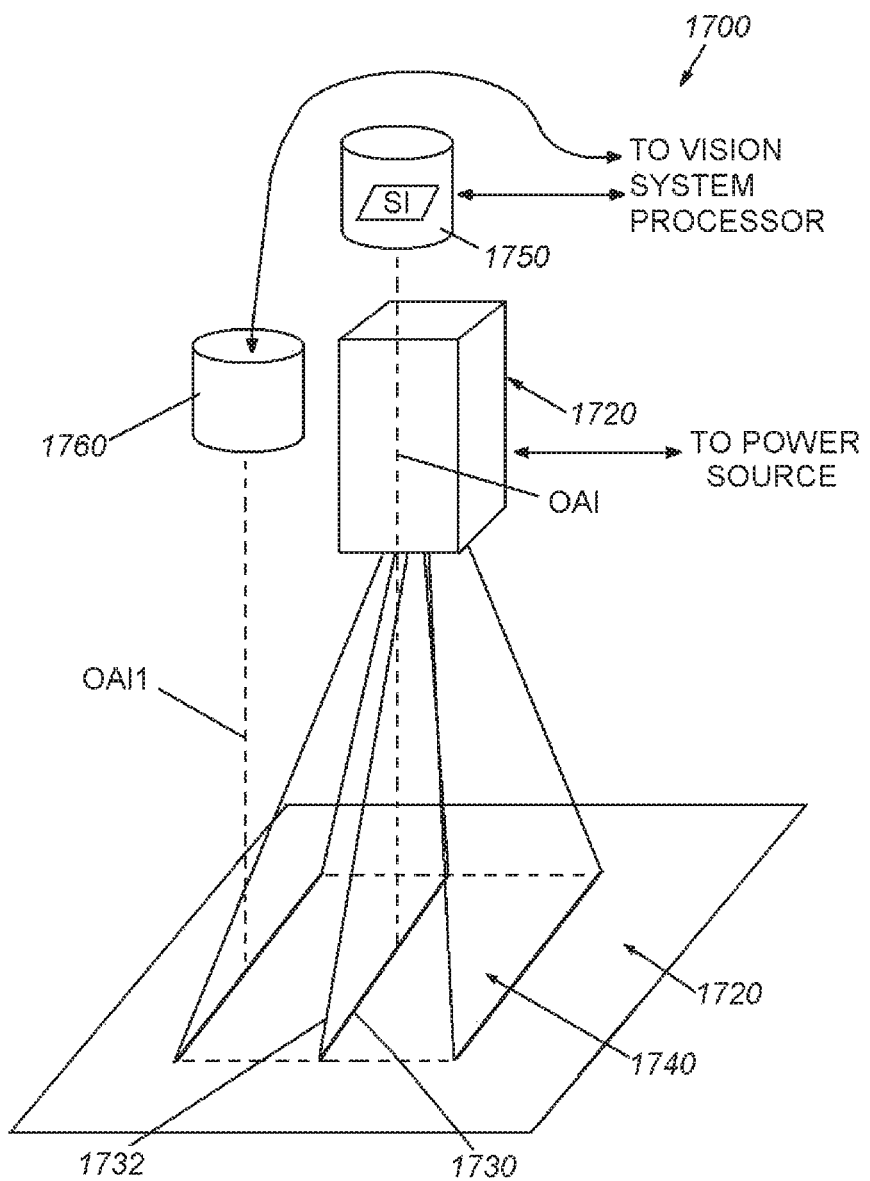
FIG. 17 is a diagram of a line generation system used to provide illumination in a 2D imaging application, either as a discrete line or as a scanned line that fills a working section of the camera.

More generally, the line generation system according to the various embodiments herein can be employed as an illumination system for use in machine vision (vision systems) and/or other applications. FIG. 17 shows an arrangement 1700, in which the line generation system 1710 according to any embodiment or arrangement herein can be used to illuminate a scene/object 1720 in a 2D imaging implementation. The illumination provided is advantageously crisper and more-well-defined. It is also more uniform and has the added advantage of, in essence, allowing the projected line 1730 (from fan 1732) to bend around obstructions and generally resist deformation based upon surface imperfections (scratch-digs), etc. By arranging the line generation system 1720 with a beam deflector (e.g. MEMS mirror) that oscillates along multiple axes (i.e. multiple degrees of freedom), the illumination can be provided as an area 1740, within the working section of the image sensor SI. The sensor SI can be part of a camera system 1750 that can be arranged via beam splitters, etc. to have an image axis OAI that id coaxial/coplanar with the illumination fan 1732. The oscillation of the line can be controlled at sufficiently fast a rate that is viewed (in an additive manner) as a single illuminated region by the image sensor SI. Alternatively, the camera 1760 can define an axis OAI1 aligned parallel to the plane of the fan 1732. In general, certain DS units can also take advantage of 2D grayscale measurements that are facilitated by the illumination line as it also provides height displacement data. The reduced speckle and increase uniformity of the generated line provides a more accurate grayscale rendition of the scene/object.

VIII. Conclusion

In should be clear that the above-described line generation system with reduced speckle provides an improved projected line for use in a variety of tasks, including 3D displacement sensors and associated vision system operations. The use of a beam deflector, or other mechanism for cyclically oscillating the source beam, and the linear diffuser in generating the line effectively eliminates the use of a Powell lens or other type line-generating optics. This has the advantage of reducing system cost and significantly improving projected and imaged line quality. The use of a 2D scanning laser in certain embodiments also effectively eliminates the need for separate motion generating components, such as motion stages, conveyors, etc. to scan an object. Also, by employing a scanning laser in combination with a diffuser, the system effectively blurs out any foreign object defects like dust and dirt on the inner and outer surfaces of optics components. This allows for greater quality in manufacturing the DS.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, also as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Also, as used herein, the terms "slow" and "fast", as they relate to scan rate, are relative terms and not meant to represent any absolute ranges of speed—unless otherwise indicated. Accordingly, this description is meant to be taken only by way of example, and not to otherwise limit the scope of this invention.

What is claimed is:

1. A system for generating a line on a working surface with reduced speckle comprising:
    a laser source configured to emit a collimated beam;
    a line generator configured to receive at least part of the collimated beam and project a light passing therethrough onto the working surface as the line, wherein the line is projected in a manner that effectively negates speckle in a manner free of substantial thickening of the line, the line generator comprising a linear diffuser configured to diffuse the light passing therethrough in a first direction but not a second direction perpendicular to the first direction; and
    a moving element that causes the collimated beam to move in an oscillatory motion substantially within at least one plane that includes the first direction.

2. The system as set forth in claim 1 wherein the laser source comprises a stationary laser beam source and further comprises a moving beam deflector operatively connected to the moving element.

3. The system as set forth in claim 2 wherein the moving element and beam deflector comprise one of a MEMS mirror, a galvanometer operated mirror, a voice coil operated mirror, Piezo electric operated mirror, and a solid state mirror unit.

4. The system as set forth in claim 3 wherein the MEMS mirror is arranged to oscillate in two substantially orthogonal degrees of freedom and so that the line is generated along a first direction and the line moves along the working surface in a second direction.

5. The system as set forth in claim 2, further comprising, within a path of the collimated beam, a polarizing beam splitter and a quarter wave plate assembly that reduces back reflection within the optical path and redirects the beam into the beam deflector.

6. The system as set forth in claim 1 further comprising a field lens that is one of (a) located between the moving element and the line generator and (b) unitary with the line generator and located between the moving element and the line generator.

7. The system as set forth in claim 1 wherein light from at least a portion of the line projected on the working surface is captured by a sensor and the sensor generates image data from the captured light.

8. The system as set forth in claim 7 wherein the image data is used by a processor to perform at least one of measurement and inspection on a region of the working surface.

9. The system as set forth in claim 1, wherein the working surface defines at least a portion of an object to be measured or inspected.

10. The system as set forth in claim 1 wherein the line generator is adapted to construct at least one of a laser displacement sensor and an illumination source.

11. The system as set forth in claim 10 wherein the laser displacement sensor is operatively connected to a vision system processor.

12. The system as set forth in claim 1 wherein the line generator comprises an optical component having at least one of a hologram and a cylinder lens.

13. The system as set forth in claim 12 wherein the line generator is adapted to, at least one of (a) project the line in a non-continuous pattern and (b) project the line in a pattern defined by at least one of dots, and line segments separated by non-illuminated gaps.

14. A method for generating a line with reduced speckle comprising:
emitting a collimated beam from a laser source; and
transmitting the collimated beam through a line generator and onto a working surface as a line, wherein the line is projected in a manner that effectively negates speckle in a manner free of substantial thickening of the line, wherein the line generator comprises a linear diffuser configured to diffuse a light passing therethrough in a first direction but not a second direction perpendicular to the first direction; and
oscillating the collimated beam in an oscillatory motion substantially within a plane that includes the first direction.

15. The method as set forth in claim 14 wherein oscillating comprises projecting a stationary laser beam source into a moving beam deflector.

16. The method as set forth in claim 15 wherein transmitting comprises passing the collimated beam through a field lens located in line with the line generator.

17. The method as set forth in claim 14 further comprising, capturing light from at least a portion of the line projected on the working surface with a sensor and generating, with the sensor, image data from the captured light.

18. The method as set forth in claim 17 further comprising, processing the image data to perform at least one of measurement and inspection on a region of the working surface.

19. The method as set forth in claim 14, wherein the working surface defines at least a portion of an object to be measured or inspection.

20. The method as set forth in claim 14, wherein oscillating includes oscillating a beam deflector at a first rate about a first axis and at a second rate about a second axis, substantially orthogonal to the first axis.

21. A system for reducing at least one of speckle effect and sparkle effect in a line projected on a surface comprising:
a collimated light source;
an optical component that generates a fan of light within one or more predetermined angles on each side of a central optical axis within a plane; and
a line generator through which the fan passes located between the optical component and the surface, wherein the line is projected in a manner that effectively negates speckle in a manner free of substantial thickening of the line, wherein the line generator comprises a linear diffuser configured to diffuse the light passing therethrough in a first direction but not a second direction perpendicular to the first direction, wherein the plane includes the first direction.

22. The system as set forth in claim 21 wherein the optical component comprises at least one of a MEMS mirror, a solid state deflector and a Powell lens.

23. A system for scanning a surface to determine a 3D profile comprising:
a vision system camera that images the surface along an optical axis;
a collimated light source;
a MEMS mirror receiving a collimated beam from the collimated light source and projecting the collimated beam onto the surface at a non-parallel angle with respect to the optical axis;
a mirror controller that oscillates the MEMS mirror in at least two orthogonal degrees of freedom so as to (a) generate a fan of light along a first direction within a one or more predetermined angles on each side of a central optical axis and (b) move the fan along a second direction to cause the fan to scan a surface; and
a line generator, through which the fan passes, located between the MEMS mirror and the surface, wherein the line is projected in a manner that effectively negates speckle in a manner free of substantial thickening of the line, the line generator comprising a linear diffuser configured to diffuse the light passing therethrough in the first direction but not a second direction perpendicular to the first direction.

24. The system as set forth in claim 23, further comprising at least one of (a) a polarizing beam splitter and quarter wave plate located along an optical path of the collimated light source and (b) a cylindrical lens within the optical path.

25. The system as set forth in claim 23 wherein the mirror controller oscillates the MEMS mirror at a first rate in the first direction and a second rate, slower than the first rate, in the second direction.

26. The system as set forth in claim 23 wherein the vision system camera includes an image sensor with a first optical plane and a lens assembly with a second optical plane that is non-parallel to the first optical plane, each oriented to adhere to a Scheimpflug principle with respect to a plane defined by the fan.

27. A system for generating a line on a working surface with reduced speckle comprising:
a laser source in a form of a collimated beam;
a line generator that receives at least part of the collimated beam and projects a light passing therethrough onto a working surface as a line, wherein the line is projected in a manner that effectively negates speckle in a manner free of substantial thickening of the line;
a moving element that causes the collimated beam to move in an oscillatory motion substantially within at least one plane; and
a moving beam deflector operatively connected to the moving element such that the moving element and moving beam deflector are configured to cycle the collimated beam to provide a sufficiently random speckle pattern within one exposure time of a sensor.

* * * * *